(12) United States Patent
Mizuno et al.

(10) Patent No.: US 12,522,158 B2
(45) Date of Patent: Jan. 13, 2026

(54) DOOR WIRING MODULE AND COMPOSITE SERVICE HOLE COVER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Osaka (JP); Koji Yamaguchi, Osaka (JP); Makoto Higashikozono, Osaka (JP); Junichi Shirakawa, Mie (JP); Satoru Aoi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 162 days.

(21) Appl. No.: 18/029,505

(22) PCT Filed: Oct. 1, 2021

(86) PCT No.: PCT/JP2021/036377
§ 371 (c)(1),
(2) Date: Mar. 30, 2023

(87) PCT Pub. No.: WO2022/085392
PCT Pub. Date: Apr. 28, 2022

(65) Prior Publication Data
US 2023/0365078 A1  Nov. 16, 2023

(30) Foreign Application Priority Data
Oct. 20, 2020 (JP) .................................. 2020-176004

(51) Int. Cl.
*B60R 16/02* (2006.01)

(52) U.S. Cl.
CPC ...... *B60R 16/0207* (2013.01); *B60R 16/0215* (2013.01)

(58) Field of Classification Search
CPC ........... H02G 3/04; H02G 3/32; B60R 6/0215
See application file for complete search history.

(56) References Cited

U.S. PATENT DOCUMENTS 3,491,971 A * 1/1970 Fisher ................... H02G 3/266
24/339
4,457,053 A * 7/1984 Niwa ..................... H02G 3/266
24/304

(Continued)

FOREIGN PATENT DOCUMENTS

CN   104838551   8/2015
CN   111016819   4/2020

(Continued)

OTHER PUBLICATIONS

International Search Report issued in International Patent Application No. PCT/JP2021/036377, dated Nov. 30, 2021.

(Continued)

*Primary Examiner* — Paresh Paghadal
(74) *Attorney, Agent, or Firm* — Greenblum & Bernstein, P.L.C.

(57) ABSTRACT

A door wiring module includes a service hole cover having a main surface with a groove, at least one wiring member housed in the groove, and a wiring cover covering an opening of the groove. A first attachment part and a second attachment part are provided on both sides of the groove in the main surface of the service hole cover. The service hole cover and the wiring cover are provided so that they can be in a free state where a space is formed between the second end portion and the second attachment part in a temporal attachment state where the first end portion of the wiring (Continued)

cover is attached to the first attachment part and the second end portion of the wiring cover is not attached to the second attachment part.

10 Claims, 7 Drawing Sheets

(56) References Cited

U.S. PATENT DOCUMENTS

| | | | | |
|---|---|---|---|---|
| D389,730 S | * | 1/1998 | Nakamura | D8/395 |
| 5,739,470 A | * | 4/1998 | Takeda | H02G 3/0487 |
| | | | | 174/101 |
| 6,079,765 A | * | 6/2000 | Zaguskin | B60R 16/02 |
| | | | | 248/68.1 |
| 6,142,556 A | * | 11/2000 | Tanaka | B60R 16/0207 |
| | | | | 296/146.7 |
| 6,206,331 B1 | * | 3/2001 | Keith | B60R 16/0215 |
| | | | | 248/74.1 |
| 6,272,746 B1 | * | 8/2001 | Mori | B60R 16/0207 |
| | | | | 269/21 |
| 10,892,282 B2 | * | 1/2021 | Takahashi | H10D 30/6756 |
| 2015/0283962 A1 | | 10/2015 | Kobayashi et al. | |
| 2018/0017750 A1 | * | 1/2018 | Clatanoff | C09J 7/22 |
| 2020/0111588 A1 | | 4/2020 | Yamamoto et al. | |
| 2021/0098976 A1 | * | 4/2021 | Yamaguchi | H02G 3/0418 |
| 2022/0017026 A1 | | 1/2022 | Yamaguchi et al. | |

FOREIGN PATENT DOCUMENTS

| | | |
|---|---|---|
| JP | 56-163016 | 12/1981 |
| JP | 9-17239 | 1/1997 |
| JP | 2002-2411 | 1/2002 |
| JP | 2005014643 | 1/2005 |
| JP | 2010-132242 | 6/2010 |
| JP | 2015-71333 | 4/2015 |
| JP | 2020-83075 | 6/2020 |

OTHER PUBLICATIONS

International Preliminary Report on Patentability issued in International Patent Application No. PCT/JP2021/036377, dated Apr. 13, 2023.

Japan Official Action received in JP Application No. 2020-176004, dated Jul. 11, 2023.

Chinese Office Action received in CN Patent Application No. 202180071191.9, dated Apr. 24, 2025, and English language translation thereof.

* cited by examiner

DOOR WIRING MODULE AND COMPOSITE SERVICE HOLE COVER

TECHNICAL FIELD

The present disclosure relates to a door wiring module and a composite service hole cover.

BACKGROUND ART

Patent Document 1 discloses a door wire harness module including a door module panel, a wire harness, and a sheet member. In the door wire harness module described in Patent Document 1, a wire harness is housed in a groove formed in one main surface of the door module panel. The sheet member is attached to one main surface of the door module panel to cover an opening of the groove.

PRIOR ART DOCUMENTS

Patent Document(s)

Patent Document 1: Japanese Patent Application Laid-Open No. 2015.71333

SUMMARY

Problem to be Solved by the Invention

When a wiring member is held by the groove and a wiring cover as with the door wire harness module described in Patent Document 1, it is desired that a structure of holding the wiring member can be simply formed.

Accordingly, an object is to provide a technique capable of simply forming a structure of holding a wiring member by a groove and a wiring cover.

Means to Solve the Problem

A door wiring module according to the present disclosure is a door wiring module including: a service hole cover having a main surface with a groove; at least one wiring member housed in the groove; and a wiring cover fixed to the service hole cover to cover an opening of the groove, wherein a first attachment part and a second attachment part are provided on both sides of the groove in the main surface of the service hole cover, a first end portion of the wiring cover is attached to the first attachment part, a second end portion of the wiring cover is attached to the second attachment part, and the service hole cover and the wiring cover can be in a free state where a space is formed between the second end portion and the second attachment part in a temporal attachment state where the first end portion is attached to the first attachment part and the second end portion is not attached to the second attachment part.

Effects of the Invention

According to the present disclosure, a structure of holding a wiring member by a groove and a wiring cover can be simply formed.

DESCRIPTION OF EMBODIMENT(S)

Description of Embodiment of Present Disclosure

Figure 1:
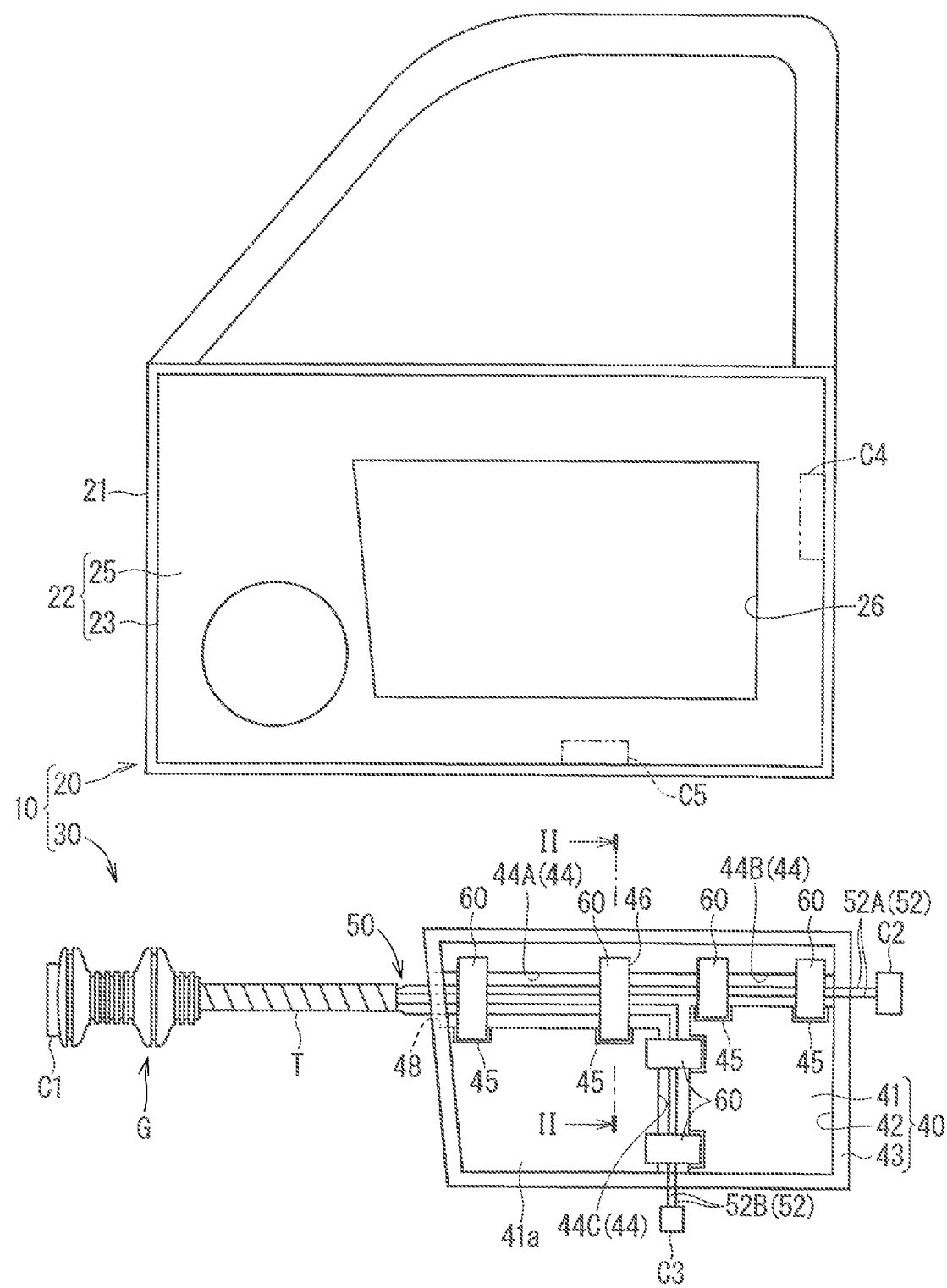
FIG. 1 is a plan view illustrating a door wiring module according to an embodiment 1 and a door panel into which the door wiring module is incorporated.

Embodiments of the present disclosure are listed and described firstly.

A door wiring module according to the present disclosure is as follows.

(1) A door wiring module includes: a service hole cover having a main surface with a groove; at least one wiring member housed in the groove; and a wiring cover fixed to the service hole cover to cover an opening of the groove, wherein a first attachment part and a second attachment part are provided on both sides of the groove in the main surface of the service hole cover, a first end portion of the wiring cover is attached to the first attachment part, a second end portion of the wiring cover is attached to the second attachment part, and the service hole cover and the wiring cover can be in a free state where a space is formed between the second end portion and the second attachment part in a temporal attachment state where the first end portion is attached to the first attachment part and the second end portion is not attached to the second attachment part. The wiring cover and the service hole cover are provided so that they can be in the free state where the space is formed between the second end portion and the second attachment part in the temporal attachment state where the first end portion is attached to the first attachment part and the second end portion is not attached to the second attachment part. Accordingly, the wiring member can be simply housed in the groove through the space between the second end portion and the second attachment part in the temporal attachment state. The first end portion is attached to the first attachment part, thus the wiring member hardly comes out of the groove until the second end portion is attached to the second attachment part after the wiring member is housed in the groove. Accordingly, a structure of holding the wiring member by the groove and the wiring cover can be simply formed.

(2) In the door wiring module according to (1), it is also applicable that in the temporal attachment state, the first attachment part supports the first end portion in a posture in which the second end portion can extend toward a free position on an upper side of the second attachment part, and the wiring cover supported by the service hole cover in a cantilever form has rigidity to an extent that the second end portion can keep free on the upper side of the second attachment part. Accordingly, the configuration of the first attachment part, the second attachment part, and the wiring cover can be simplified.

(3) In the door wiring module according to (2), an attachment surface of the second attachment part may be located closer to a bottom part of the groove along a height direction of the groove than a virtual planar surface formed by extending an attachment surface of the first attachment part. Accordingly, the second end portion can be in the free state on the upper side of the second attachment part in a state where the planar wiring cover is supported by the service hole cover in a cantilever form.

(4) In the door wiring module according to (2) or (3), the attachment surface of the first attachment part may be an inclined surface having a smaller height from the bottom part of the groove with increasing distance from the groove. Accordingly, the space between the second end portion of the wiring cover and the second attachment part can be easily increased in the state where the second end portion of the wiring cover is located in a free position.

(5) In the door wiring module according to (4), the attachment surface of the second attachment part may be an inclined surface having a larger height from the bottom part of the groove with increasing distance from the groove. Accordingly, concentration of stress hardly occurs in the wiring cover in the state where the second end portion of the wiring cover is attached to the second attachment part.

(6) In the door wiring module according to any one of (1) to (5), a portion of the bottom part of the groove on a side of the first attachment part along a width direction of the groove may be an inclined surface having a larger depth toward the side of the first attachment part. Accordingly, suppressed is that the wiring member housed in the groove gets stuck between the first end portion of the wiring cover and the first attachment part.

(7) In the door wiring module according to any one of (1) to (6), it is also applicable that the wiring cover is provided in a first position and a second position at interval along a longitudinal direction of the groove, and the second end portion of the wiring cover in the first position and the second end portion of the wiring cover in the second position are provided on a same side with respect to the groove. Accordingly, when the wiring member is housed in the groove through the space between the second end portion and the second attachment part, the wiring member can be housed from the same side with respect to the groove in the first position and the second position, thus the wiring member can be simply housed in the groove.

(8) In the door wiring module according to any one of (1) to (6), it is also applicable that the wiring cover is provided in a first position and a second position at interval along a longitudinal direction of the groove, and the second end portion of the wiring cover in the first position and the second end portion of the wiring cover in the second position are provided on sides opposite to each other with respect to the groove. Accordingly, when the second end portion of the wiring cover is attached to the second attachment part after the wiring member is housed in the groove, the opposite side with respect to the groove is closed in each of the first position and the second position, thus the wiring member hardly comes out of the groove.

(9) In the door wiring module according to any one of (1) to (8), the plurality of wiring members may be housed in the groove in a state of being free from each other. Accordingly, the plurality of wiring members in a state of being free from each other are housed in the groove, thus can be collected.

(10) A composite service hole cover according to the present disclosure includes: a service hole cover having a main surface with a groove; and a wiring cover having a first end portion and a second end portion, wherein a first attachment part and a second attachment part are provided on both sides of the groove in the main surface of the service hole cover, in the wiring cover, the first end portion is attached to the first attachment part, an intermediate portion between the first end portion and the second end portion covers an opening of the groove, and a space is located between the second end portion and the second attachment part. In the wiring cover, the first end portion is attached to the first attachment part, the intermediate portion between the first end portion and the second end portion covers the opening of the groove, and the space is located between the second end portion and the second attachment part. Accordingly, the wiring member can be simply housed in the groove through the space between the second end portion of the wiring cover and the second attachment part. The first end portion of the wiring cover is attached to the first attachment part, thus the wiring member hardly comes out of the groove until the second end portion is attached to the second attachment part after the wiring member is housed in the groove. Accordingly, a structure of holding the wiring member by the groove and the wiring cover can be simply formed.

DETAILS OF EMBODIMENT OF PRESENT DISCLOSURE

Specific examples of a door wiring module of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
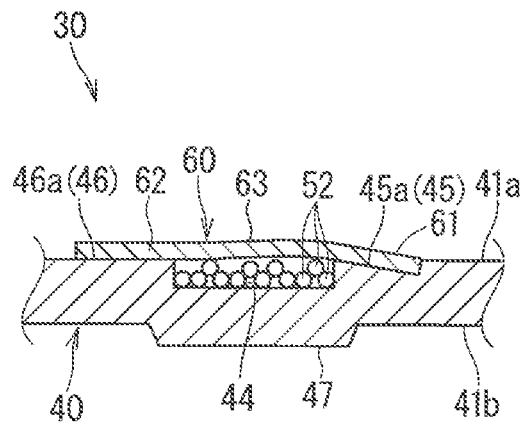
FIG. 2 is a cross-sectional view along a II-II line in FIG. 1.

A door wiring module according to an embodiment 1 is described hereinafter. FIG. 1 is a plan view illustrating a door wiring module 30 according to the embodiment 1 and a door panel 20 into which the door wiring module 30 is incorporated. FIG. 2 is a cross-sectional view along a II-II line in FIG. 1.

Firstly, an outline of a door 10 in a vehicle is described. The door 10 is formed into a flat shape as a whole, and is a part openable and closable to partition an inner side and outer side of a vehicle. The door 10 is assumed to be a driver side door, a passenger's side door, and a rear seat door, for example. The door 10 includes a door panel 20, a design trim, and the door wiring module 30.

The door panel 20 includes an outer panel 21 and an inner panel 22. The outer panel 21 is provided to a portion of the door 10 facing an outer side of the vehicle to constitute an appearance of the vehicle together with a body part. The inner panel 22 is provided to a vehicle interior side of the outer panel 21. The inner panel 22 includes a side plate part 23 and a main plate part 25. The side plate part 23 is a part protruding from the outer panel 21 to the inner side of the vehicle. The main plate part 25 is a part continuing into the side plate part 23, and extends along the outer panel 21 with a distance from the outer panel 21. A space is formed between the outer panel 21, the main plate part 25, and the side plate part 23. A door apparatus provided to the door 10 is disposed and a window glass is housed in the space. A service hole 26 is provided to the main plate part 25 of the inner panel 22. An operator can have access to the space between the outer panel 21 and the inner panel 22 via the service hole 26 from an outer side of the inner panel 22.

The design trim is a part provided in a part of the door 10 facing the inner side of the vehicle to constitute the interior of the vehicle. An inner handle and an operation part of an in-vehicle apparatus, for example, are attached to the design trim. A portion of the door wiring module 30 incorporated into the door 10 is disposed between the design trim and the outer panel 21.

The door wiring module 30 includes a service hole cover 40, a wiring member 50, and a wiring cover 60.

The service hole cover 40 covers the service hole 26. The service hole cover 40 is a flat resin component extending to a range approximately equal to or wider than the service hole 26. The service hole cover 40 is attached to cover the service hole 26. An attachment state where the service hole cover 40 is attached to the service hole 26 of the inner panel 22 is held by screwing, a locking structure, or adhesion, for example. For example, when a peripheral part of the service hole cover 40 overlapped with the inner panel 22 is bonded to the inner panel 22, a gap therebetween can be practicably covered.

The service hole cover 40 partitions the inner side of the vehicle of the space between the outer panel 21 and the inner panel 22. The window glass exposed to a rainwater environment is housed in the space, and a slit-like opening through which the window glass goes in and out is formed on an upper side of the space. Thus, the space is a space which water may enter. The space is a space which may be connected to an outer space, thus is also a space which a wind noise, for example, may enter from outside. Thus, it is sufficient that the service hole cover 40 is provided as a member for completely partitioning a vehicle interior space and an outer space with the inner panel 22. More specifically, the service hole cover 40 includes a cover body part 41, a frame part 42, and a flange part 43. For example, the service hole cover 40 is a component made up of molded resin such as polypropylene (PP), and has rigidity of hardly bended.

The cover body part 41 is a portion planarly extend to a range slightly smaller than the service hole 26. The frame part 42 is formed to protrude to a side of one main surface 41a (inner side of the vehicle) of the cover body part 41 from an outer edge of the cover body part 41. The flange part 43 is formed to protrude to a side of an outer periphery from an outer edge of the frame part 42. It is sufficient that the frame part 42 is formed to have an inclined surface with a gradually decreasing height dimension from the flange part 43 toward the cover body part 41. The cover body part 41 is disposed on an inner side of the service hole 26 (closer to a side of the outer panel 21 than the main plate part 25) while the service hole cover 40 is attached to a predetermined position of the service hole 26 of the inner panel 22, the flange part 43 is disposed on an outer side of the service hole 26 (closer to the inner side of the vehicle than the main plate part 25), and the frame part 42 connects the cover body part 41 and the flange part 43. Accordingly, the frame part 42 and the flange part 43 cover a portion between an opening edge portion of the cover body part 41 and a peripheral edge portion of the service hole 26.

A groove 44 is formed in a main surface of the service hole cover 40 (the main surface 41a of the cover body part 41). Herein, the groove 44 is formed in the main surface 41a of the service hole cover 40 directed to the inner side of the vehicle. The groove 44 may be formed in the main surface 41b of the service hole cover 40 directed to the outer side of the vehicle. The groove 44 may be formed in both the main surfaces 41a and 41b.

The groove 44 is formed to have a size capable of collectively housing the plurality of wiring members 50. The groove 44 is flatly formed so that a width dimension thereof is larger than a depth dimension thereof. It is sufficient that the depth dimension of the groove 44 is larger than a diameter of the wiring member 50 (in a case where the plurality of wiring members 50 include a wiring member with a different thickness, a diameter of the maximum wiring member 50). It is sufficient that the depth dimension of the groove 44 is more than twice as large as the diameter of the wiring member 50 (in a case where the plurality of wiring members 50 include a wiring member with a different thickness, a diameter of the minimum wiring member 50) so that the wiring members 50 can be stacked in two or more layers and housed therein. A plurality of grooves each having a size capable of separately housing the plurality of wiring members 50 may be formed in parallel to each other as the groove 44. For example, a plurality of grooves each having a size to house one wiring member 50 may be formed in parallel to each other.

An opening part of the groove 44 is covered by the wiring cover 60. A first attachment part 45 and a second attachment part 46 to which the wiring cover 60 is attached are provided to the service hole cover 40. The first attachment part 45 and the second attachment part 46 are provided separately on both sides of the groove 44 in the main surface 41a. The first attachment part 45 and the second attachment part 46 are described in detail hereinafter.

A portion located on a side opposite to the groove 44 in the main surface 41b on a side opposite to the main surface 41a in which the groove 44 is formed is a convexed part 47. Accordingly, reduction of a thickness of a portion where the groove 44 is formed is suppressed. However, the portion located on a side opposite to the groove 44 in the main surface 41b may not be the convexed part 47. The portion located on the side opposite to the groove 44 and a surrounding portion in the main surface 41b may be flat.

An insertion hole 48 through which the wiring member 50 passes is formed in the service hole cover 40. The wiring member 50 passes through the service hole cover through the insertion hole 48. It is sufficient that the insertion hole 48 is formed in the cover body part 41 or the frame part 42 in the service hole cover 40. Herein, the insertion hole 48 is formed in the frame part 42. Particularly, the insertion hole 48 is formed in a position of an end portion of the groove 44 in the frame part 42 herein. Accordingly, the wiring member 50 housed in the groove 44 can pass through the service hole cover 40 through the insertion hole 48.

The wiring member 50 connects the door apparatus and a vehicle body apparatus provided to a vehicle body to supply electrical power to the door apparatus or transmit a signal between the door apparatus and the vehicle body apparatus. The wiring member 50 may include an electrical wire 52. A covering wire having a core wire made up of a conductor with a covering layer around the core wire can be used as the electrical wire 52. The core wire may be a single core wire or a stranded wire. A type of the electrical wire 52 is not particularly limited, but can include a single wire or a composite wire. The single wire is an electrical wire having one conductive route. The composite wire is an electrical wire having a plurality of conductive routes. Applicable as the composite wire is a twisted wire or a composite cable, for example, formed of a plurality of single wires combined with each other. The wiring member 50 may include an optical fiber cable, for example. The number of the wiring members 50 is set in accordance with the number of the door apparatuses. The plurality of wiring members 50 are normally provided.

A route of the plurality of wiring members 50 is appropriately set in accordance with a specification of the door 10. For example, in a case of a general hinge door having a rotational axis extends along a height direction of a vehicle, the plurality of wiring members 50 assembled to the hinge door is normally connected to a vehicle body at a position near a door hinge, and are branched at a time of being directed from a side of the door hinge toward a side opposite to the door hinge to be connected to various types of door apparatus.

More specifically, it is assumed that one end portions of the plurality of wiring members 50 go through a part of the door 10 (the side plate part 23 on the side of the door hinge in the example illustrated in FIG. 1) to extend from the door 10 in a bundled state, and is led inside the vehicle body to be connected to the vehicle body apparatus via a common connector C1, for example, or a relay connector provided to an end portion of a wiring member extending from the vehicle body apparatus. The vehicle body apparatus is not particularly limited, but is assumed to be an electric control unit (ECU) or a battery, for example. A grommet G is normally attached to a portion of the plurality of wiring members 50 extending between the door 10 and the vehicle body. In the example illustrated in FIG. 1, the grommet G is a so-called feed-through grommet inserted and locked to a through hole formed in the side plate part 23. Accordingly, ingress of water through the through hole is suppressed. The grommet G may be a so-called non-feed-through grommet fitted into a concave part formed in an edge portion where the side plate part 23 and the main plate part 25 meet. The plurality of wiring members 50 extend from the grommet G on a way from one end portion to the other portion, and are branched and extend toward the door apparatus as connection destinations, respectively. Connectors C2 and C3 corresponding to the door apparatuses as the connection destinations, respectively, are attached to the other end portions of the plurality of wiring members 50. The connectors C2 and C3 are connected to connectors C4 and C5 on sides of the door apparatuses, respectively, for example. FIG. 1 and FIG. 2 exemplify the connectors C4 and C5 on the sides of two door apparatuses and electrical wires 52A and 52B connected to the connectors C4 and C5 via the connectors C2 and C3, respectively. The connector C4 is a connector for an actuator for locking and unlocking the door 10, for example. The connector C5 is a connector for a foot light, for example.

In FIG. 1 and FIG. 2, illustration of a connector and a wiring member other than the connectors C1 to C3 and the electrical wires 52A and 52B connected to the connectors C1 to C3 is omitted. Needless to say, the door wiring module 30 may include a connector other than the connectors C1 to C3 or a wiring member other than the electrical wires 52A and 52B.

The electrical wires 52A and 52B pass through the service hole cover 40 through the insertion hole 48 on a way from a portion provided with the grommet G toward the connectors C2 and C3, and extend closer to the inner side of the vehicle than the service hole cover 40. It is also applicable that the electrical wires 52A and 52B pass through a hole in the inner panel 22 other than the service hole 26 on a way from a portion provided with the grommet G toward the connectors C2 and C3 and extend closer to the inner side of the vehicle than the inner panel 22.

A section in the electrical wire 52 extending between the grommet G and the service hole cover 40 may be a banded wire portion bundled by a banding member. In the example illustrated in FIG. 1, the plurality of electrical wires 52 are banded by an adhesive tape T spirally wound. The banding member may be a banding band, a flexible sheet, or a corrugate tube, for example. It is sufficient that the banding member bands the plurality of electrical wires 52 in a state where the plurality of electrical wires 52 can be bended.

A section in the electrical wire 52 extending along the service hole cover 40 is disposed closer to the inner side of the vehicle than the service hole cover 40. A route of a section in the electrical wire 52 extending along the service hole cover 40 is regulated by the service hole cover 40. The state where the route of the electrical wire 52 is regulated indicates that the route of the electrical wire 52 is maintained in a predetermined route.

A section in the electrical wire 52 extending along the service hole cover 40 is housed in the groove 44. The groove 44 is formed along a route of the electrical wire 52 in relation to the service hole cover 40. Herein, three grooves 44A, 44B, and 44C are formed as the groove 44. The groove 44A is formed along a front-back direction of the vehicle from a front portion to a back portion of the service hole cover 40. When the service hole cover 40 is observed from the vehicle interior side, the groove 44A is linearly formed to extend along the front-back direction of the vehicle. The grooves 44B and 44C are branched from an end portion of the groove 44A. The groove 44B is linearly formed to extend along the front-back direction of the vehicle. The groove 44C is linearly formed to extend along a height direction of the vehicle. Each groove 44 needs not linearly extend on the main surface 41a of the cover body part, but may be bended and extend on the main surface 41a of the cover body part.

The electrical wires 52A and 52B are branched into two branch wire parts from one main wire part in the branch part on the service hole cover 40. The main wire part is a portion where the electrical wires 52A and 52B are parallelly arranged. Two branch wire parts are portions where the electrical wires 52A and 52B extend independently. The main wire part is housed in the groove 44A, and two branch wire parts are housed in the grooves 44B and 44C, respectively. The grooves 44A and 44B can be used to hold the electrical wire 52A connected to the door apparatus incorporated into a back portion of the door 10 such as an actuator for locking and unlocking the door, for example. The grooves 44A and 44C can be used to hold the electrical wire 52B connected to the door apparatus incorporated into a lower portion of the door 10 such as a foot light, for example. Each groove 44 in a cross-sectional view may be formed to have a size corresponding to the wiring member 50 housed in the groove 44. The groove 44A housing the main wire part in a cross-sectional view may be formed to have a size larger than the grooves 44B and 44C each housing the branch wire part in a cross-sectional view.

The plurality of electrical wires 52 are housed in the groove 44 in a state of being free from each other. The state of being free from each other indicates a state where the plurality of electrical wires 52 are not banded by a banding member. The plurality of electrical wires 52 are located separately one by one in the groove 44. A section in the plurality of electrical wires 52 disposed on the service hole cover 40 is in a banded state by being housed in the groove 44 and covered by the wiring cover 60. The plurality of electrical wires 52 may be housed in the groove 44 while being banded by the banding member.

The wiring cover 60 is fixed to the service hole cover 40. The wiring cover 60 covers the opening of the groove 44. The wiring cover 60 may be formed into a plate-like shape to be disposed to extend across the groove 44 on the upper portion of the groove 44, for example. Portions of the wiring cover 60 each protruding to both sides of the groove 44 are a first end portion 61 and a second end portion 62. A portion of the wiring cover 60 connecting the first end portion 61 and the second end portion 62 and covering the upper side of the groove 44 is an intermediate portion 63. The first end portion 61 is attached to the first attachment part 45, and the second end portion 62 is attached to the second attachment part 46.

In the example illustrated in FIG. 1, the wiring cover 60 is provided in a position of one end portion and the other end portion along the longitudinal direction of each groove 44. However, the position where the wiring cover 60 is provided in the service hole cover 40 is not particularly limited, but can be appropriately set. For example, the wiring cover 60 may be provided only in one position for a groove having a short length. For example, the wiring cover 60 may be provided in positions of one end portion and the other end portion and moreover, in a position therebetween along the longitudinal direction of the groove for the groove having a long length.

<Structure of Holding Wiring Member>

Figure 3:
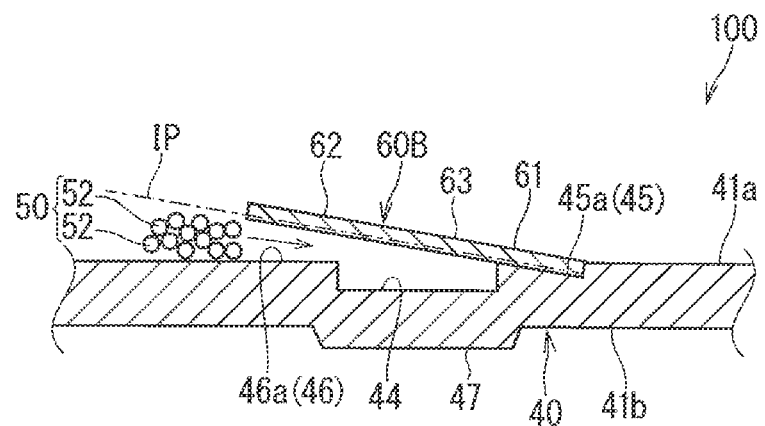
FIG. 3 is a schematic diagram illustrating a wiring member housed in a groove.
Figure 4:
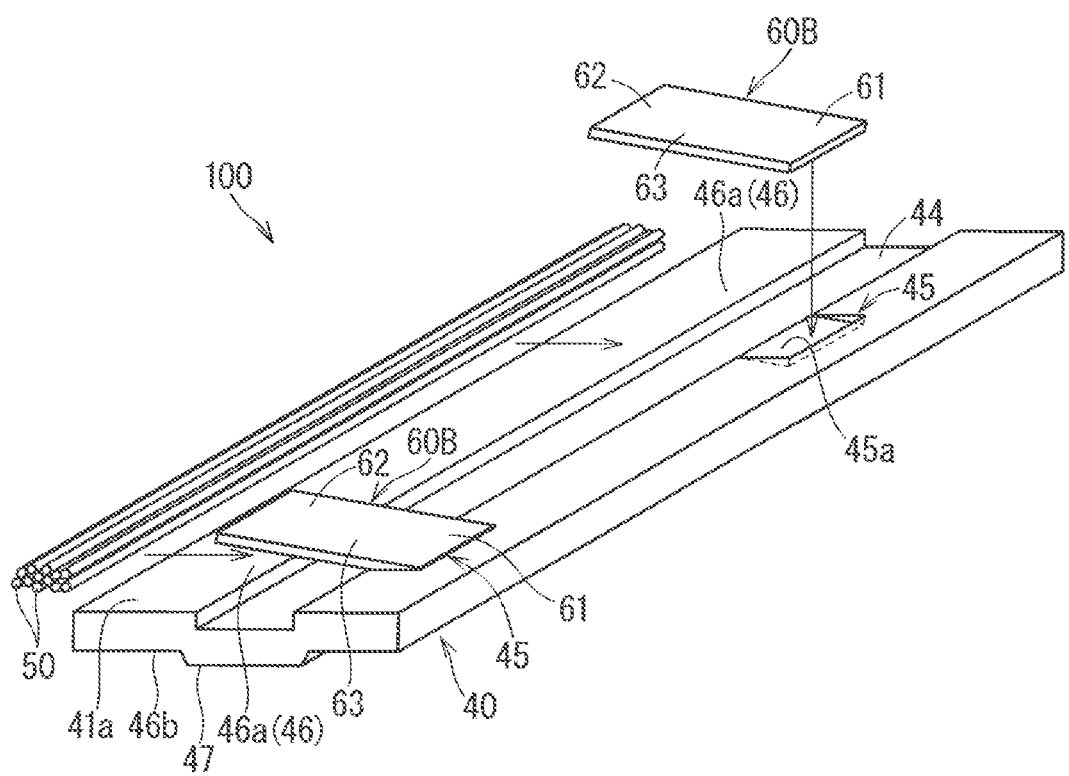
FIG. 4 is a schematic diagram illustrating a wiring member housed in a groove.
Figure 5:
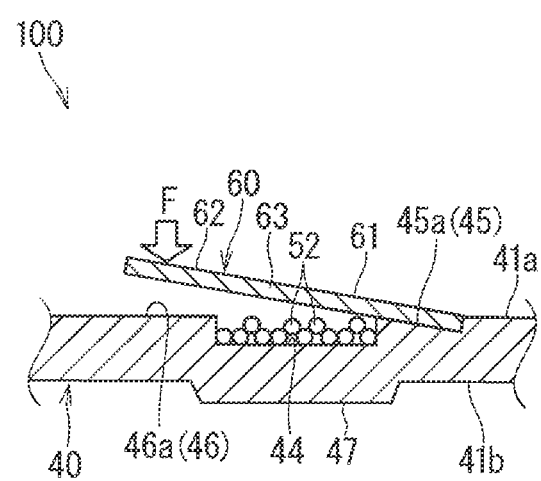
FIG. 5 is a schematic diagram illustrating a second end portion of a wiring cover attached to a second attachment part after the wiring member is housed in the groove.

Formation of a structure of holding the wiring member 50 by the groove 44 and the wiring cover 60 is described with reference to FIG. 3 to FIG. 5 in addition to FIG. 1 and FIG. 2. FIG. 3 and FIG. 4 are schematic diagrams each illustrating the wiring member 50 housed in the groove 44. FIG. 5 is a schematic view illustrating the second end portion 62 of the wiring cover 60 attached to the second attachment part 46 after the wiring member 50 is housed in the groove 44.

As illustrated in FIG. 3 and FIG. 4, the service hole cover 40 and the wiring cover 60 are provided so that they can be in the free state where the space is formed between the second end portion 62 and the second attachment part 46 in a state where the first end portion 61 is attached to the first attachment part 45 and the second end portion 62 is not attached to the second attachment part 46. In the present disclosure, the state where the first end portion 61 is attached to the first attachment part 45 and the second end portion 62 is not attached to the second attachment part 46 is referred to a temporal attachment state, and a state where the first end portion 61 is attached to the first attachment part 45 and the second end portion 62 is attached to the second attachment part 46 is referred to a real attachment state in some cases. After the wiring member 50 is housed in the groove 44 in the temporal attachment state, the second end portion 62 is attached to the second attachment part 46 to enter the real attachment state. In the present example, the wiring cover 60 is assumed to be deformed when the state makes a transition from the temporal attachment state to the real attachment state. In the description hereinafter, when the wiring cover 60 before the real attachment state needs to be distinguished from the wiring cover 60 in the real attachment state, the wiring cover 60 may be referred to as the wiring cover 60B by adding a sign B in some cases. In FIG. 4, one of the two wiring covers 60B is in the temporal attachment state. FIG. 4 illustrates that the other one thereof is before the temporal attachment state. The other wiring cover 60B is in the temporal attachment state in the manner similar to one wiring cover 60B.

In the temporal attachment state, a state where the second end portion 62 is in the free state on the upper side of the second attachment part 46 by an extension direction and rigidity of the wiring cover 60B. More specifically, in the temporal attachment state, the first attachment part 45 supports the first end portion 61 in a posture in which the second end portion 62 can extend toward a free position on the upper side of the second attachment part 46. At this time, the wiring cover 60B is supported by the service hole cover 40 in a cantilever form by attaching the first end portion 61 to the first attachment part 45. The wiring cover 60B supported in the cantilever form in such a manner keeps a state where the second end portion 62 is free on the upper side of the second attachment part 46 by rigidity of itself. Accordingly, the wiring cover 60B supported in the cantilever form by the service hole cover 40 has rigidity to an extent that the second end portion 62 can keep free on the upper side of the second attachment part 46.

The attachment surface 46a of the second attachment part 46 is flat. The attachment surface 46a of the second attachment part 46 is located closer to the bottom part of the groove 44 along a height direction of the groove 44 than a virtual planar surface IP formed by extending the attachment surface 45a of the first attachment part 45 to a side of the second attachment part 46. Accordingly, even when a flat plate-like member whose both surfaces are flat as illustrated in FIG. 4 is used as the wiring cover 60B, a space occurs between the second end portion 62 and the second attachment part 46 in the temporal attachment state.

The attachment surface 45a of the first attachment part 45 is an inclined surface having a smaller height from the bottom part of the groove 44 with increasing distance from the groove 44. The first end portion 61 of the flat plate-like wiring cover 60B is attached to the attachment surface 45a, thus the intermediate portion 63 and the second end portion 62 of the wiring cover 60B extend obliquely upward. Accordingly, even when the flat plate-like wiring cover 60B is used, a space gets large between the second end portion 62 and the second attachment part 46 in the temporal attachment state.

The inclined surface as the attachment surface 45a is partially provided along the longitudinal direction of the groove 44, thus a position of the first attachment part can be easily recognized in the service hole cover 40. Furthermore, a regulation surface intersecting with the attachment surface 45a is provided on both sides of the groove 44 in the longitudinal direction on the attachment surface 45a. Accordingly, deviation of the wiring cover 60B along the longitudinal direction of the groove 44 is suppressed at a time of fusing the first attachment part 45 and the first end portion 61. A dimension of the inclined surface along the longitudinal direction of the groove 44 may be set to be equal to or larger than a width dimension of the wiring cover 60B, for example. The inclined surface as the attachment surface 45a needs not be partially provided along the longitudinal direction of the groove 44, however, a whole area of a lateral portion of the groove 44 may constitute the inclined surface along the longitudinal direction of the groove 44.

The regulation surface intersecting with the attachment surface 45a is provided to an edge portion of the attachment surface 45a of the first attachment part 45 on a side opposite to an edge portion on a side of the groove 44. A tip end of the first end portion 61 of the wiring cover 60B touches the regulation surface. Accordingly, a position of the wiring cover 60B along the width direction of the groove 44 is regulated. The regulation surface is provided on three sides of the attachment surface 45a. From the other viewpoint, the first attachment part 45 is a concave part in which a portion surrounded by the regulation surface is partially concaved, and a bottom surface of the concave part is the attachment surface 45a.

In the description herein, a structure of attaching the first end portion 61 and the first attachment part 45 is fusion. In this case, the service hole cover 40 and the wiring cover 60B are preferably made up of the same type of resin. For example, the service hole cover 40 and the wiring cover 60B can be formed of PP as a main component. The structure of attaching the first end portion 61 and the first attachment part 45 needs not be fusion, but can be appropriately set. For example, the structure of attaching the first end portion 61 and the first attachment part 45 may be fusion via an adhesive member disposed therebetween. The structure of attaching the first end portion 61 and the first attachment part 45 may be a locking structure in which the convexed part 47 formed on one side is fitted into a concave part formed on the other side.

The edge portion of the attachment surface 45a on the side of the groove 44 is preferably fused to the first end portion 61. Accordingly, when the state makes a transition from the temporal attachment state to the real attachment state after the electrical wire 52 is housed in the groove 44, suppressed is that the electrical wire 52 gets stuck between the attachment surface 45a and the first end portion 61.

The wiring cover 60B is provided in the first position and the second position at interval along the longitudinal direction of the groove 44. The second end portion 62 of the wiring cover 60B in the first position and the second end portion 62 of the wiring cover 60B in the second position are provided on the same side with respect to the groove 44. Thus, as illustrated in FIG. 4, the wiring member 50 can be moved toward the groove 44 from the same side with respect to the groove 44 in the first position and the second position.

After the wiring member 50 is housed in the groove 44, as illustrated in FIG. 5, external force F is applied to the wiring cover 60B, and the second end portion 62 is moved to the attachment position of the second attachment part 46. The external force F is assumed to be force caused by direct pressing by an operator or force caused by pressing by a fusion machine. At this time, a portion of the wiring cover 60B including the second end portion 62 is bended with respect to the first end portion 61 by the external force F. Furthermore, the wiring cover 60B is bended by the external force F, thus stress occurs in the wiring cover 60B.

Strength in attaching the first end portion 61 and the first attachment part 45 in the temporal attachment state is large enough to withstand the stress of the wiring cover 60B when the wiring cover 60B is bended by the external force F to attach the second end portion 62 and the second attachment part 46 in the temporal attachment state. More specifically, the stress occurring in the wiring cover 60B by being bended by the external force F is to release the attachment state of attaching the first end portion 61 and the first attachment part 45. Strength in attaching the first end portion 61 and the first attachment part 45 in the temporal attachment state is large enough to keep the attachment state while the stress is applied thereto.

The second end portion 62 is attached to the second attachment part 46 while being moved to the attachment position where the second end portion 62 is attached to the second attachment part 46, thereby entering the real attachment state. A structure of attaching the second end portion 62 and the second attachment part 46 is also appropriately set, and adoptable is one of the attachment structures described above in attaching the first end portion 61 and the first attachment part 45, for example. The structure of attaching the second end portion 62 and the second attachment part 46 may be the same as or different from that of attaching the first end portion 61 and the first attachment part 45.

The wiring cover 60B bended by the external force F in the temporal attachment state is kept in the bended state even after the wiring cover 60B is in the real attachment state and the external force F is removed. Accordingly, in the real attachment state, the wiring cover 60 is bended between the first end portion 61 and the second end portion 62. In the real attachment state, the stress caused by the bending is applied to the wiring cover 60. The wiring cover 60 is attached to the service hole cover 40 while the stress is applied to the wiring cover 60.

The strength in attaching the first end portion 61 and the first attachment part 45 and the strength in attaching the second end portion 62 and the second attachment part 46 in the real attachment state are large enough to withstand the stress occurring in the wiring cover 60 in the present attachment state. More specifically, this bending deformation in the wiring cover 60 in the real attachment state is deformation caused by pressing the second end portion 62 against the attachment surface 46a of the second attachment part 46. Thus, the bending deformation of the wiring cover 60 is elastic deformation or plastic deformation with small permanent distortion. For example, the permanent distortion is assumed to be smaller than an initial space between the second end portion 62 and the second attachment part 46 in the temporal attachment state. Thus, stress according to this bending deformation remains in the wiring cover 60. Such stress is to release the attachment state of attaching the first end portion 61 and the first attachment part 45 and the attachment state of attaching the second end portion 62 and the second attachment part 46. The strength in attaching the first end portion 61 and the first attachment part 45 and the strength in attaching the second end portion 62 and the second attachment part 46 are large enough to keep the attachment state while the stress is applied thereto.

In the case where the stress according to the bending deformation remains in the wiring cover 60 in the real attachment state, when one of the attachment state of attaching the first end portion 61 and the first attachment part 45 and the attachment state of attaching the second end portion 62 and the second attachment part 46 is released, the wiring cover 60 is to release the stress. More specifically, the wiring cover 60 is deformed so that the end portion of the wiring cover 60 is free with a space from the attachment part of the service hole cover 40.

In the real attachment state, the stress according to the bending deformation may be small in the wiring cover 60. When one of the attachment state of attaching the first end portion 61 and the first attachment part 45 and the attachment state of attaching the second end portion 62 and the second attachment part 46 is released, it is also applicable that a state where an end portion of a released portion and the attachment part have contact with each other can be maintained. For example, it is also applicable that bending deformation of the wiring cover 60 is plastic deformation with large permanent distortion, thus stress according to the bending deformation is small in the wiring cover 60. In this case, the permanent distortion is assumed to be equal to or larger than an initial space between the second end portion 62 and the second attachment part 46 in the temporal attachment state. For example, it is also applicable that the wiring cover 60 is heated and in the real attachment state to reduce the stress according to the bending deformation in the wiring cover 60.

Effect Etc. of Embodiment 1

According to the door wiring module 30 having the configuration described above, the wiring cover 60 and the service hole cover 40 are provided so that they can be free with the space formed between the second end portion 62 and the second attachment part 46 in the temporal attachment state. Accordingly, the wiring member 50 can be simply housed in the groove 44 through the space between the second end portion 62 and the second attachment part 46 in the temporal attachment state. The first end portion 61 is attached to the first attachment part 45 in the temporal attachment state, thus the wiring member 50 hardly comes out of the groove 44 until the second end portion 62 is attached to the second attachment part 46 after the wiring member 50 is housed in the groove 44. Accordingly, a structure of holding the wiring member 50 by the groove 44 and the wiring cover 60 can be simply formed.

In the temporal attachment state, the first attachment part 45 supports the first end portion 61 in a posture that the second end portion 62 can extend toward the free position on the upper side of the second attachment part 46, and the wiring cover 60B supported in the cantilever form by the service hole cover 40 has rigidity to the extent that the second end portion 62 can keep free on the upper side of the second attachment part 46. Accordingly, the configuration of the first attachment part 45, the second attachment part 46, and the wiring cover 60B can be simplified.

The attachment surface 46a of the second attachment part 46 is located closer to the bottom part of the groove 44 along the height direction of the groove 44 than the virtual planar surface IP formed by extending the attachment surface 45a of the first attachment part 45. Accordingly, the second end portion 62 can be in the free state on the upper side of the second attachment part 46 in the state where the planar wiring cover 60B is supported by the service hole cover 40 in the cantilever form.

The attachment surface 45a of the first attachment part 45 is the inclined surface having a smaller height from the bottom part of the groove 44 with increasing distance from the groove 44. Accordingly, the space between the second end portion 62 of the wiring cover 60B and the second attachment part 46 can be easily increased in the state where the second end portion 62 of the wiring cover 60B is located in the free position. When this inclined surface is partially provided in a position corresponding to a portion provided with the wiring cover 60B along the longitudinal direction of the groove 44, a position where the wiring cover 60B is attached can be easily recognized in the service hole cover 40.

The wiring cover 60 is provided in the first position and the second position at interval along the longitudinal direction of the groove 44, and the second end portion 62 of the wiring cover 60 in the first position and the second end portion 62 of the wiring cover 60 in the second position are provided on the same side with respect to the groove 44. Accordingly, when the wiring member 50 is housed in the groove 44 through the space between the second end portion 62 and the second attachment part 46, the wiring member 50 can be housed from the same side with respect to the groove 44 in the first position and the second position, thus the wiring member 50 can be simply housed in the groove 44.

The plurality of electrical wires 52 are housed in the groove 44 in a state of being free from each other. Accordingly, the plurality of electrical wires 52 in the state of being free from each other are housed in the groove 44, thus can be collected. Herein, when the plurality of electrical wires 52 are free from each other, each electrical wire 52 can be locally bended in an optical position. Thus, it is difficult to keep a state where the plurality of electrical wires 52 are housed in the groove 44 before both ends of the wiring cover 60 is closed. Even in this case, in the present example, the first end portion 61 is attached to the first attachment part 45 in a temporal fixation state, the second end portion 62 is free on the upper side of the second attachment part 46, and the intermediate portion 63 covers the groove 44, thus it is easy to keep the state where the plurality of electrical wires 52 are housed in the groove 44 before both ends of the wiring cover 60 is closed in the attachment position of the wiring cover 60.

In the present disclosure, as illustrated in FIG. 3 to FIG. 5, the service hole cover provided with the wiring cover 60 in the temporal attachment state can be considered a composite service hole cover 100. The composite service hole cover 100 includes the service hole cover 40 in which the groove 44 is formed in the main surface 41a and the wiring cover 60 including the first end portion 61 and the second end portion 62. The first attachment part 45 and a second attachment part 46 are provided on both sides of the groove 44 in the main surface 41a of the service hole cover 40. In the wiring cover 60, the first end portion 61 is attached to the first attachment part 45, the intermediate portion 63 located between the first end portion 61 and the second end portion 62 covers the opening of the groove 44, and the space is located between the second end portion 62 and the second attachment part 46.

According to the composite service hole cover 100 having such a configuration, in the wiring cover 60, the first end portion 61 is attached to the first attachment part 45, the intermediate portion 63 located between the first end portion 61 and the second end portion 62 covers the opening of the groove 44, and the space is located between the second end portion 62 and the second attachment part 46. Accordingly, the wiring member 50 can be simply housed in the groove 44 through the space between the second end portion 62 of the wiring cover 60 and the second attachment part 46. The first end portion 61 of the wiring cover 60 is attached to the first attachment part 45, thus the wiring member 50 hardly comes out of the groove 44 until the second end portion 62 of the wiring cover 60 is attached to the second attachment part 46 after the wiring member 50 is housed in the groove 44. Accordingly, a structure of holding the wiring member 50 by the groove 44 and the wiring cover 60 can be simply formed.

Modification Example

Figure 6:
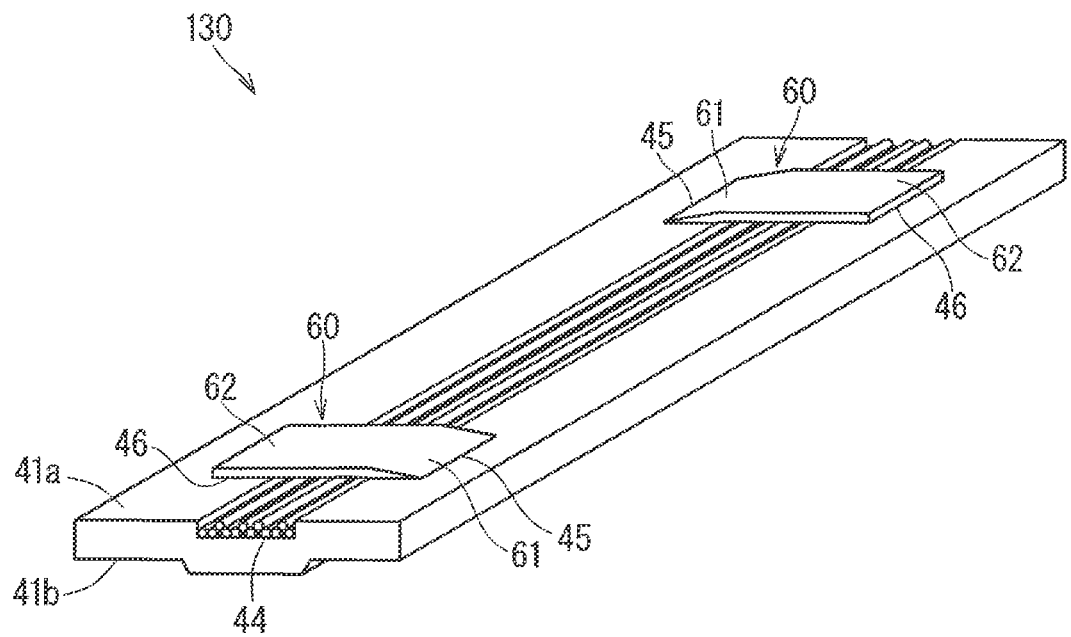
FIG. 6 is a cross-sectional view illustrating a first modification example of the door wiring module.
Figure 7:
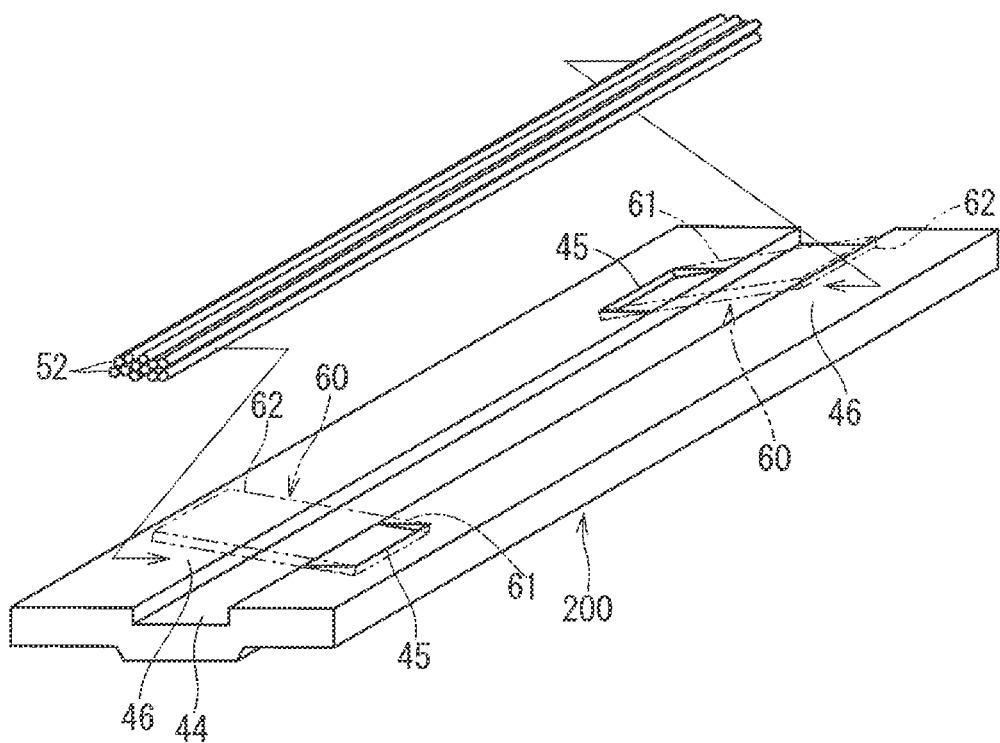
FIG. 7 is a cross-sectional view illustrating a first modification example of the composite service hole cover.

FIG. 6 is a cross-sectional view illustrating a first modification example of the door wiring module 30. FIG. 7 is a cross-sectional view illustrating a first modification example of the composite service hole cover 100. A composite service hole cover 200 according to the first modification example is used for a door wiring module 130 according to the first modification example.

The present example is the same as the example described above in that the wiring cover 60 is provided in the first position and the second position at interval along the longitudinal direction of the groove 44. The present example is different from the example described above in that the second end portion 62 of the wiring cover 60 in the first position and the second end portion 62 of the wiring cover 60 in the second position are disposed on sides opposite to each other with respect to the groove 44. According to the door wiring module 130 and the composite service hole cover 200 having such configurations, when the second end portion 62 of the wiring cover 60 is attached to the second attachment part 46 after the wiring member 50 is housed in the groove 44, the opposite side with respect to the groove 44 is closed in each of the first position and the second position, thus the wiring member 50 hardly comes out of the groove 44.

Figure 8:
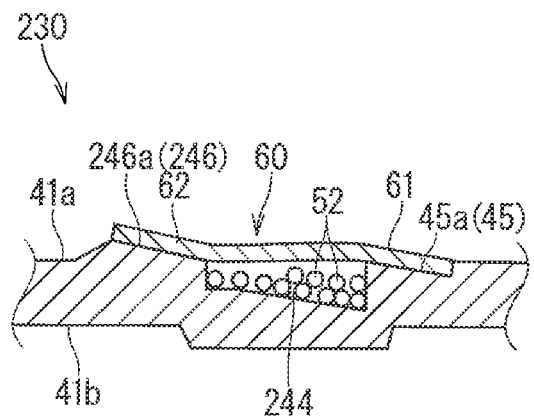
FIG. 8 is a cross-sectional view illustrating a second modification example of the door wiring module.
Figure 9:
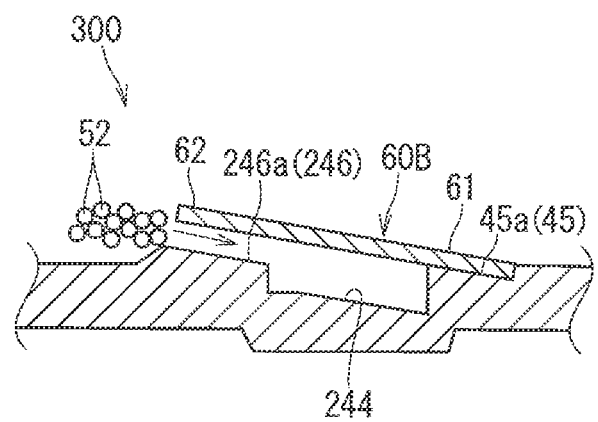
FIG. 9 is a cross-sectional view illustrating a second modification example of the composite service hole cover.

FIG. 8 is a cross-sectional view illustrating a second modification example of the door wiring module 30. FIG. 9 is a cross-sectional view illustrating a second modification example of the composite service hole cover 100. A composite service hole cover 300 according to the second modification example is used for a door wiring module 230 according to the second modification example.

In the present example, an attachment surface 246a of a second attachment part 246 is an inclined surface having a larger height from a bottom part of a groove 244 with increasing distance from the groove 244. Accordingly, concentration of stress hardly occurs in the wiring cover 60 in the real attachment state. An inclination angle of the attachment surface 45a of the first attachment part 45 may be the same as that of the attachment surface 246a of the second attachment part 246, or one of them may be larger than the other one of them.

The inclined surface as the attachment surface 246a may be partially provided along the longitudinal direction of the groove 244 in the manner similar to the inclined surface as the attachment surface 45a. The inclined surface as the attachment surface 246a may also be wholly provided along the longitudinal direction of the groove 244.

Herein, a dimension of the inclined surface as the attachment surface 246a is set to be substantially equal to a length dimension of the second end portion 62 in a width direction of the groove 244. A guide inclined surface inclined in a direction opposite to the inclined surface as the attachment surface 246a is provided on a lateral side of the inclined surface. Accordingly, as illustrated in FIG. 9, when the wiring member 50 is housed in the groove 244 through the space between the second end portion 62 and the second attachment part 246, the wiring member 50 is easily guided in the space between the second end portion 62 and the second attachment part 246. Increase in a region where a thickness of the service hole cover 40 is increased can be suppressed. From a viewpoint that the wiring member 50 is guided between the second end portion 62 and the second attachment part 246, a flat surface having the same height as a top part of the inclined surface as the attachment surface 246a may extend on a lateral side of the top part thereof. The inclined surface as the attachment surface 246a may have a length longer than the second end portion 62 to an extent that the wiring member 50 can be located thereon.

In the present example, a portion of the bottom part of the groove 244 on a side of the first attachment part 45 is an inclined surface having depth deeper with decreasing distance to the side of the first attachment part 45 along the width direction of the groove 244. Accordingly, the wiring member 50 housed in the side of the first attachment part of the groove 244 hardly runs over the groove 244, and suppressed is that the wiring member 50 gets stuck between the first end portion 61 of the wiring cover 60 and the first attachment part 45. Herein, a portion of the bottom part of the groove 244 closer to the first attachment part 45 than the intermediate portion 63 along the width direction is the inclined surface. A whole bottom part of the groove 24 along the width direction may be the inclined surface. An inclination angle of the attachment surface 45a of the first attachment part 45 may be the same as that of the bottom part of the groove 244, or one of them may be larger than the other one of them.

Figure 10:
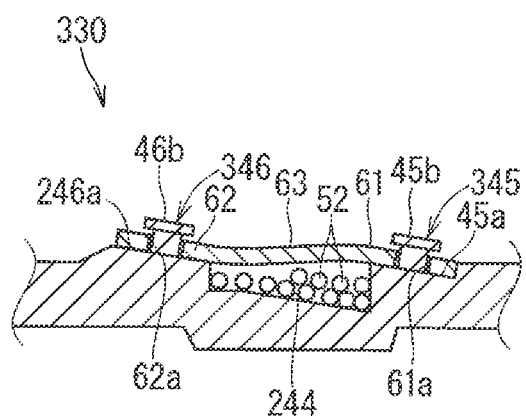
FIG. 10 is a cross-sectional view illustrating a third modification example of the door wiring module.
Figure 11:
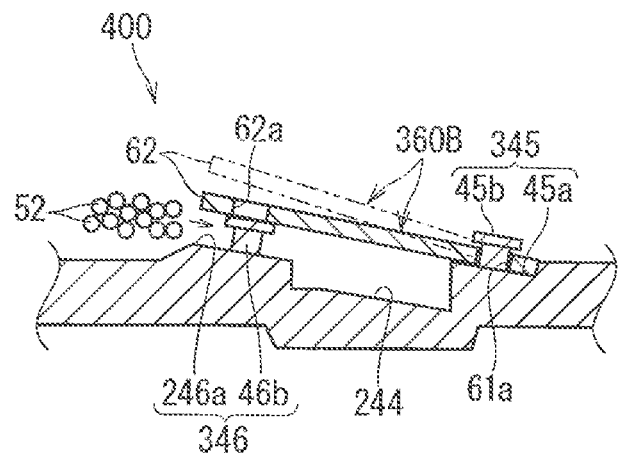
FIG. 11 is a cross-sectional view illustrating a third modification example of the composite service hole cover.

FIG. 10 is a cross-sectional view illustrating a third modification example of the door wiring module 30. FIG. 11 is a cross-sectional view illustrating a third modification example of the composite service hole cover 100. A composite service hole cover 400 according to the third modification example is used for a door wiring module 330 according to the third modification example.

In the present example, a structure of attaching the first end portion 61 and a first attachment part 345 and a structure of attaching the second end portion 62 and a second attachment part 346 are not fusion, but are a locking structure using convex parts 45b and 46b and concave parts 61a and 62a. Herein, the convex parts 45b and 46b are provided to the first attachment part 345 and the second attachment part 346, respectively. The convex part 45b of the first attachment part 345 protrudes from the attachment surface 45a, and the convex part 46b of the second attachment part 346 protrudes from the attachment surface 246a. A through hole is formed as each of the concave parts 61a and 62a in the first end portion 61 and the second end portion 62. The convex part 45b is inserted into and locked to the concave part 61a to attach the first end portion 61 and the first attachment part 345. The convex part 46b is inserted into and locked to the concave part 62a to attach the second end portion 62 and the second attachment part 346.

It is sufficient that in the temporal attachment state, the tip end of the second end portion 62 and the attachment surface 246a of the second attachment part 346 are free with a space therebetween. The convex part 46b and a portion of the second end portion 62 closer to the intermediate side in relation to the tip end thereof may have contact with each other. In this case, as shown by a dashed-two dotted line in FIG. 11, it is sufficient that a wiring cover 360B can be deformed so that the second end portion 62 of the wiring cover 360B is opened with a space from the convex part 46b. Needless to say, in the wiring cover, the second end portion 62 may be free with a space from the convex part 46b in an initial state of the temporal attachment state.

Figure 12:
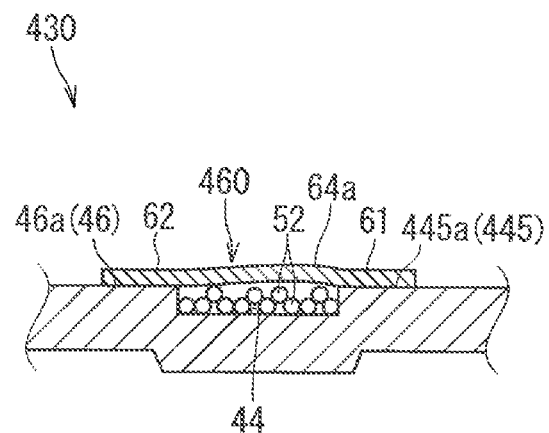
FIG. 12 is a cross-sectional view illustrating a third modification example of the door wiring module.
Figure 13:
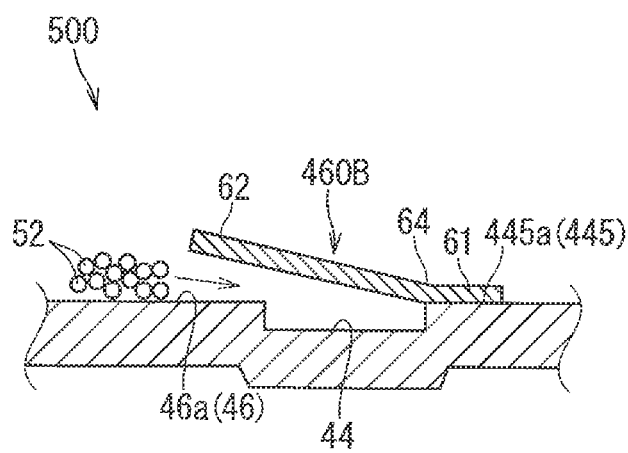
FIG. 13 is a cross-sectional view illustrating a fourth modification example of the composite service hole cover.

FIG. 12 is a cross-sectional view illustrating a fourth modification example of the door wiring module 30. FIG. 13 is a cross-sectional view illustrating a fourth modification example of the composite service hole cover 100. A composite service hole cover 500 according to the fourth modification example is used for a door wiring module 430 according to the fourth modification example.

In the present example, a state where the second end portion 62 and the second attachment part 46 in the temporal attachment state are free with a space is formed by a shape of the wiring cover 460B. The height of the attachment surface 46a of the second attachment part 46 coincides with a height of a virtual planar surface IP formed by extending the attachment surface 445a of the first attachment part 445 to a side of the second attachment part 46. Both the attachment surfaces 445a and 46a are flat surfaces. A bending part is provided on a way from the first end portion 61 toward a free position of the second end portion 62 in the wiring cover 460B. Herein, a bending part 64 is provided between the first end portion 61 and the intermediate portion 63. A trace 64a of the bending part 64 remains also in the wiring cover 460 in the real attachment state. That is to say, the wiring cover 460 is not flat but is distorted in a portion of the trace 64a. It is also considered that a fold line remains as the trace 64a.

Figure 14:
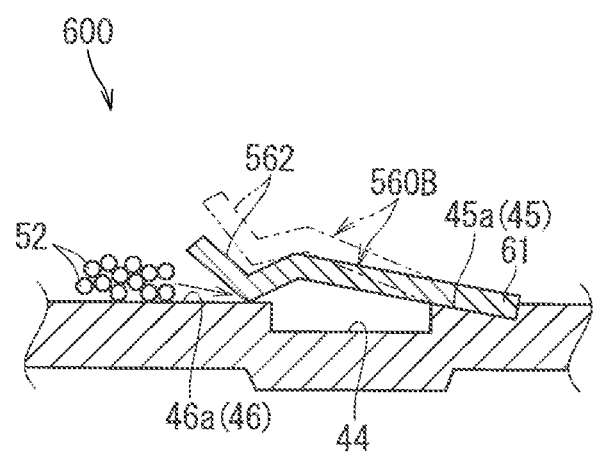
FIG. 14 is a cross-sectional view illustrating a fifth modification example of the composite service hole cover.

FIG. 14 is a cross-sectional view illustrating a fifth modification example of the composite service hole cover 100.

In a composite service hole cover 600 according to the fifth modification example, a portion including a second end portion 562 is bended to have a V-like shape in the wiring cover 560B. A tip end of the second end portion 562 is free with a space from the second attachment part 46. The wiring cover 560B gradually gets closer to the second attachment part 46 from the tip end of the second end portion 562 toward a portion of a bottom of the V-like shape. In this case, as shown by a dashed-two dotted line in FIG. 14, it is sufficient that the wiring cover 60B can be deformed so that the portion of the bottom of the V-like shape is opened with a space from the second attachment part 46. In the wiring cover 560B, the portion of the bottom of the V-like shape may be fused to the second attachment part 46 to be in the real attachment state. It is also applicable that in the wiring cover 560B, a portion closer to a tip end side of the second end portion 562 than the portion of the bottom of the V-like shape is fused to the attachment surface 46a of the second attachment part 46 while being bended to have contact with the attachment surface 46a of the second attachment part 46 to be in the real attachment state.

The configurations described in the embodiments and modification examples thereof can be appropriately combined as long as they are not contradictory.

EXPLANATION OF REFERENCE SIGNS 10 door
20 door panel
21 outer panel
22 inner panel
23 side plate part
25 main plate part
26 service hole
30, 130, 230, 330, 430 door wiring module
40 service hole cover
41 cover body part
41a, 41b main surface
42 frame part
43 flange part
44, 44A, 44B, 44C, 244 groove
45, 345, 445 first attachment part
45a, 46a, 246a attachment surface
45b, 46b convex part
46, 246, 346 second attachment part
47 convexed part
48 insertion hole
50 wiring member
52, 52A, 52B electrical wire
60, 60B, 460B, 560B wiring cover
61 first end portion
61a, 62a concave part
62 second end portion
63 intermediate portion
64 bending part
64a trace
100, 200, 300, 400, 500, 600 composite service hole cover
C1, C2, C3, C4, C5 connector
G grommet
IP virtual planar surface
T adhesive tape

The invention claimed is:

1. A door wiring module, comprising:
a service hole cover having a main surface with a groove;
at least one wiring member housed in the groove; and
a wiring cover fixed to the service hole cover to cover an opening of the groove, wherein
a first attachment part and a second attachment part are provided on both sides of the groove in the main surface of the service hole cover,
a first end portion of the wiring cover is attached to the first attachment part, a second end portion of the wiring cover is configured to be attached to the second attachment part, and
the wiring cover has a rigidity such that in an undeformed state a space is formed between the second end portion and the second attachment part, wherein the space is configured to allow the at least one wiring member to move into the groove in a temporal attachment state where the first end portion is attached to the first attachment part and the second end portion is not attached to the second attachment part.

2. The door wiring module according to claim 1, wherein in the temporal attachment state, the first attachment part supports the first end portion in a posture in which the second end portion can extend toward a free position on an upper side of the second attachment part, and the wiring cover supported by the service hole cover in a cantilever form has the rigidity to an extent that the second end portion can keep the space between the upper side of the second attachment part.

3. The door wiring module according to claim 2, wherein an attachment surface of the second attachment part is located closer to a bottom part of the groove along a height direction of the groove than a virtual planar surface formed by extending an attachment surface of the first attachment part.

4. The wiring module according to claim 2, wherein an attachment surface of the first attachment part is an inclined surface having a smaller height from the bottom part of the groove with increasing distance from the groove.

5. The door wiring module according to claim 4, wherein an attachment surface of the second attachment part is an inclined surface having a larger height from the bottom part of the groove with increasing distance from the groove.

6. The door wiring module according to claim 1, wherein a portion of a bottom part of the groove on a side of the first attachment part along a width direction of the groove is an inclined surface having a larger depth toward the side of the first attachment part.

7. The door wiring module according to claim 1, wherein the wiring cover includes a first wiring cover and a second wiring cover, the first wiring cover is provided in a first position and the second wiring cover is provided in a second position at an interval along a longitudinal direction of the groove, and
the second end portion being defined by an end of the first wiring cover in the first position and the second end portion being further defined by an end of the second wiring cover in the second position, wherein the second end portion of the first wiring cover and the second end portion of the second wiring cover are provided on a same side with respect to the groove.

8. The door wiring module according to claim 1, wherein the wiring cover includes a first wiring cover and a second wiring cover, the first wiring cover is provided in a first position and the second wiring cover is provided in a second position at an interval along a longitudinal direction of the groove, and the second end portion being defined by an end of the first wiring cover in the first position and the second end portion being further defined by an end of the second wiring cover in the second position, wherein the second end portion of the first wiring cover and the second end portion of the second wiring cover are provided on sides opposite to each other with respect to the groove.

9. The door wiring module according to claim 1, wherein the at least one wiring member includes a plurality of wiring members that are housed in the groove in a state of being free from each other.

10. A composite service hole cover, comprising:

a service hole cover having a main surface with a groove; and a wiring cover having a first end portion and a second end portion, wherein a first attachment part and a second attachment part are provided on both sides of the groove in the main surface of the service hole cover, and in the wiring cover, the first end portion is attached to the first attachment part, the second end portion is configured to be attached to the second attachment part, an intermediate portion between the first end portion and the second end portion covers an opening of the groove, wherein the wiring cover has a rigidity such that in an undeformed state a space is located between the second end portion and the second attachment part, and wherein the space is configured to allow at least one wiring member to move into the groove in a temporal attachment state where the first end portion is attached to the first attachment part and the second end portion is not attached to the second attachment part.

\* \* \* \* \*